US012711098B2

(12) United States Patent
He et al.

(10) Patent No.: US 12,711,098 B2
(45) Date of Patent: Aug. 18, 2026

(54) METHODS AND SYSTEMS FOR PRELOADING CONTAINERS VIA SECONDARY DISKS

(71) Applicant: Google LLC, Mountain View, CA (US)

(72) Inventors: Tao He, Seattle, WA (US); Samuel Benjamin Karp, Lynnwood, WA (US); Daniel Vega-Myhre, Seattle, WA (US); Ibrahim Aboulfetouh, Bellevue, WA (US); Benjamin Hosein Kazemi, Redmond, WA (US); Ruiwen Zhao, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/410,013

(22) Filed: Jan. 11, 2024

(65) Prior Publication Data

US 2025/0231909 A1 Jul. 17, 2025

(51) Int. Cl.
*G06F 16/00* (2019.01)
*G06F 16/11* (2019.01)
*G06F 16/16* (2019.01)

(52) U.S. Cl.
CPC .......... *G06F 16/128* (2019.01); *G06F 16/164* (2019.01)

(58) Field of Classification Search
CPC ....... G06F 16/00; G06F 16/128; G06F 16/124
See application file for complete search history.

(56) References Cited

U.S. PATENT DOCUMENTS 10,509,664 B1 12/2019 Halcrow et al.
11,573,816 B1 * 2/2023 Featonby ................ H04L 67/10
2006/0053139 A1 3/2006 Marzinski et al.
2010/0274784 A1 * 10/2010 Acharya ............... G06F 16/164 707/E17.143
2020/0285609 A1 * 9/2020 Guo .................... G06F 16/9017
2022/0222100 A1 * 7/2022 Srivastava ............ G06F 9/5077
2023/0229561 A1 7/2023 Iyer et al.
2023/0315502 A1 10/2023 Pan et al.
2024/0160750 A1 * 5/2024 Pascual ................... G06F 21/53
2024/0201979 A1 * 6/2024 Guan ...................... G06F 8/656
2024/0248742 A1 * 7/2024 Frosi ....................... G06F 9/455
2025/0124006 A1 * 4/2025 Wu ....................... G06F 16/188

OTHER PUBLICATIONS

Shaleen Garg et al, "CrossPrefetch: Accelerating I/O Prefetching for Modern Storage," ASPLOS '24, Apr. 27-May 1, 2024, ACM, pp. 1-15. (Year: 2024).*

Google, About node auto-provisioning, https://cloud.google.com/kubernetes-eng ine/docs/concepts/node-auto-provisioning, Oct. 30, 2023. 9 pages.

* cited by examiner

*Primary Examiner* — Cheryl Lewis
(74) *Attorney, Agent, or Firm* — Lerner David LLP

(57) ABSTRACT

The disclosure provides a container orchestration system for preloading containers via secondary disks. The container orchestration system includes creating a disk image with preloaded containers. The disk image can include a container image pre-downloaded and pre-unpacked, ready to be used by container runtime. The container orchestration system includes creating a node with the disk image and attaching the disk to a node when a node is created. The container orchestration system further includes reading a container image from the disk. When the node creator configures the disk mode as a local cache, the container orchestration system can read the container image by caching the image from the disk without the image-pulling process.

20 Claims, 6 Drawing Sheets

METHODS AND SYSTEMS FOR PRELOADING CONTAINERS VIA SECONDARY DISKS

BACKGROUND

Large container images significantly contribute to the startup delay of containers, especially with artificial intelligence (AI) or machine learning (ML) workloads where these large images are standard. When these workloads are scheduled on a new node, the entire container image is downloaded and decompression occurs, otherwise known as a cold start. During a cold start, the container images are not cached on the node. The container images therefore need to be pulled from an external image repository. The substantial size of machine learning libraries within the container, notably large graphics processing unit (GPU) libraries, further exacerbates the slowness of this download and unpacking process.

BRIEF SUMMARY

Aspects of the disclosure are directed to a container orchestration system for preloading containers via secondary disks. The container orchestration system is configured to create a disk image for a secondary disk with preloaded containers, create a node pool, and attach the secondary disk to the node pool. A container orchestrator on a node utilizes cached container images from the preloaded container on the secondary disk while building a container filesystem to run instances on the node.

One aspect of the disclosure provides a method of preloading container images via secondary disks on a node, comprising generating, with one or more processors, a disk image with a container image of a preloaded container for a secondary disk; creating, with the one or more processors, a node with the disk image; and reading, with the one or more processors, the preloaded container from at least one disk during container runtime. The at least one disk may be a persistent disk, a secondary boot disk, etc. The disk image may include binary data, encapsulating an application and software dependencies. Creating the disk image with the container image of the preloaded container may comprise creating a disk; receiving an image name of the container image of the preloaded container; downloading and unpacking the container image using the image name from the disk; mounting the secondary disk; and creating a snapshot of the container image from the disk. Creating the snapshot of the container image from the disk may comprise creating a temporary view of a container image layer; copying the snapshot into a specific location on the secondary disk; and creating a metadata file related to the snapshot and the specific location on the secondary disk. The metadata may include a snapshot identifier and a snapshot path.

According to some examples, the method may further comprise attaching the secondary disk to the node by updating a workload of the node. Updating the workload of the node may include specifying a disk identifier (ID) of the secondary disk on a specification of the node. Attaching the secondary disk to the node may include specifying a disk mode of the secondary disk as a local cache; and appending a mount path of the disk with the specified disk mode on a specification of the node pool.

Another aspect of the disclosure provides a system for preloading container images via secondary disks on a node, comprising memory; and one or more processors in communication with the memory. The one or more processors may be configured to generate a disk image with a container image of a preloaded container for a secondary disk; create a node with the disk image; and read the preloaded container from at least one disk during container runtime. The at least one disk may be a persistent disk, a secondary boot disk, etc. The disk image may include binary data, encapsulating an application and software dependencies. Creating the disk image with the container image of the preloaded container may comprise creating a disk; receiving an image name of the container image of the preloaded container; downloading and unpacking the container image using the image name from the disk; mounting the secondary disk; and creating a snapshot of the container image from the disk. Creating the snapshot of the container image from the disk may comprise creating a temporary view of a container image layer; copying the snapshot into a specific location on the secondary disk; and creating a metadata file related to the snapshot and the specific location on the secondary disk. The metadata may include a snapshot identifier and a snapshot path.

According to some examples, the one or more processors may be configured to attach the secondary disk to the node by updating a workload of the node. The one or more processors may be configured to specify a disk identifier (ID) of the secondary disk on a specification of the node. The one or more processors may be configured to specify a disk mode of the secondary disk as a local cache; and append a mount path of the disk with the specified disk mode on a specification of the node.

DETAILED DESCRIPTION

Figure 1:
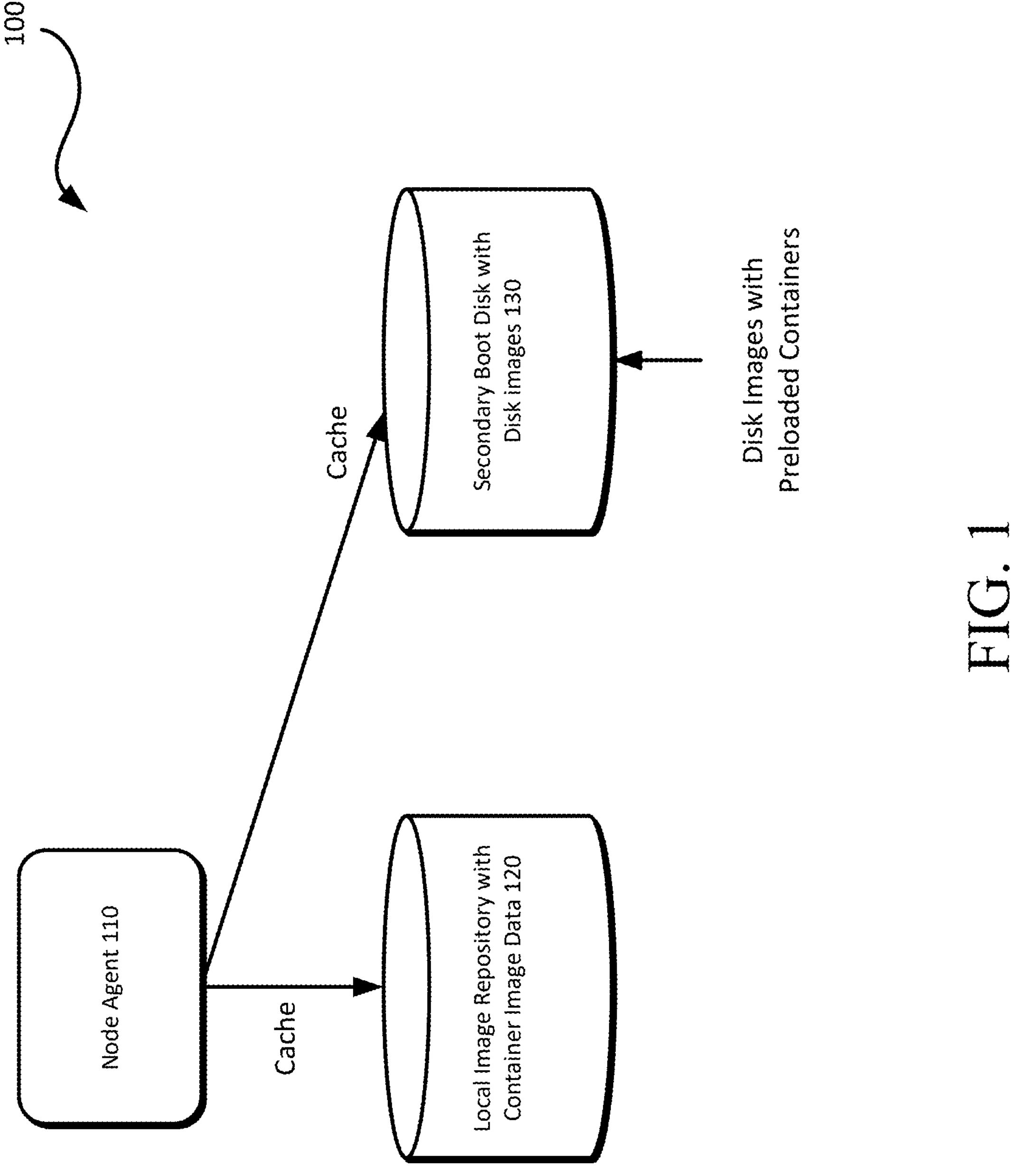
FIG. 1 depicts a block diagram of an example preloaded container via secondary disk according to aspects of the disclosure.

Generally disclosed herein are implementations for a container orchestration platform for preloading containers via secondary disks. FIG. 1 depicts a block diagram of an example preloaded container via secondary disk 100. Initially, the container image can be stored in an external image repository. When a pod is created for application deployment, the container orchestration platform pulls the container image from the external image repository and downloads it locally onto the node. Once the image is downloaded to the local node, it is stored and cached within the disk attached to the local node. Subsequently, when containers of the same image are executed, the node agent of the container orchestration platform can utilize the cached image without the need for re-downloading. As shown in FIG. 1, node agent 110 is a component responsible for managing and supervising the execution of containers. The node agent 110 caches the images of containers stored within the local storage 120, enabling immediate execution of containers upon deployment.

For containers with large-scale images, there can be substantial delays in image loading when creating a pod. To address this issue, the container orchestration platform can preload the container and generate a secondary disk image with the preloaded container. A secondary boot disk image, composed of a customer-defined container image, is created. The secondary boot disk image is included in a template that defines a collection of nodes, such as a node pool, wherein each node may be a worker such as a virtual machine. When a new node is created, a virtual disk is created from the disk image, and the virtual disk is individually attached to a node. In some examples, the virtual disk may be attached to multiple nodes. During container execution, the node agent 110 can access and cache the disk image from the secondary disk 130, mitigating the delays experienced during image loading.

Figure 2:
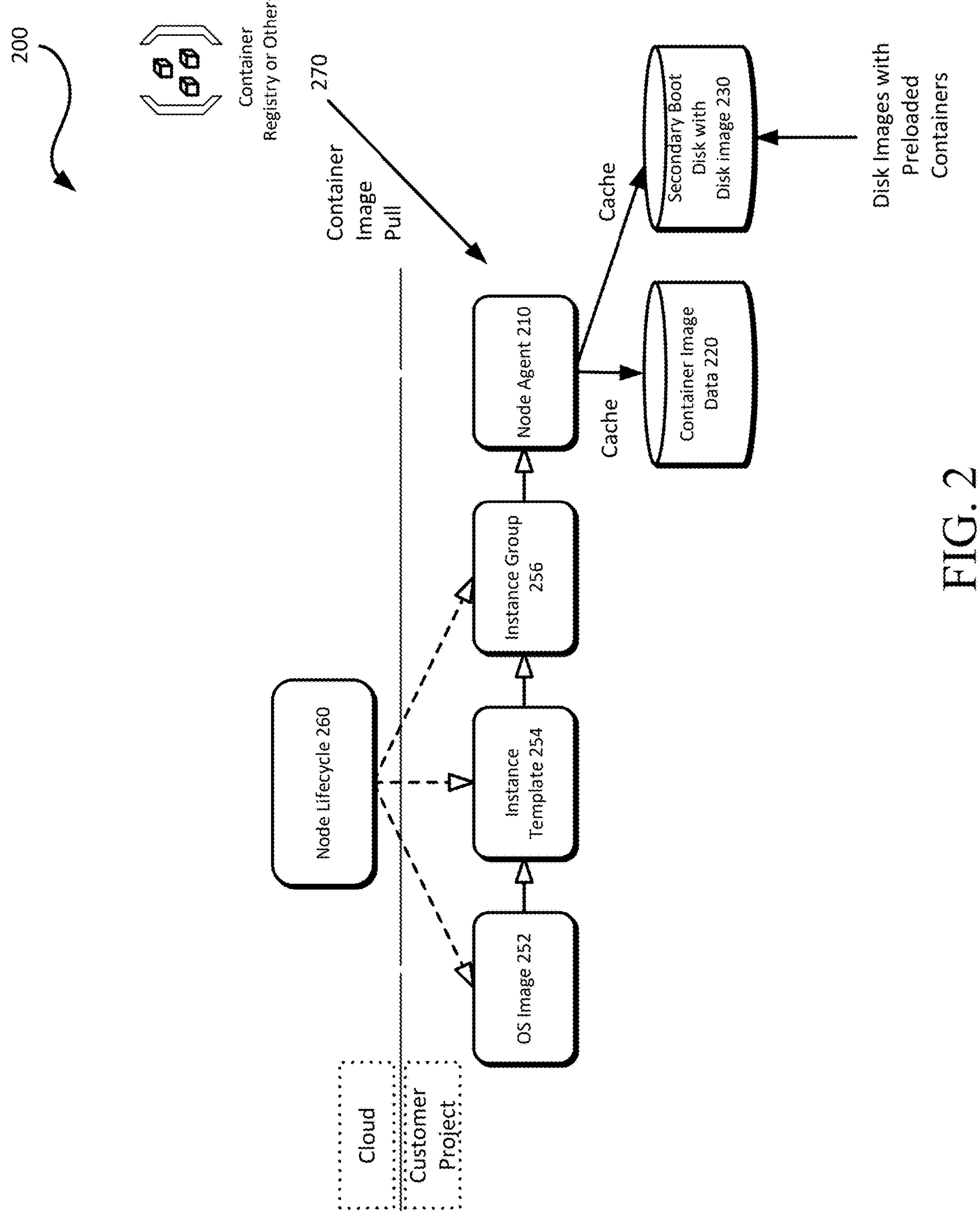
FIG. 2 depicts a block diagram of an example architecture of a container orchestration platform according to aspects of the disclosure.

FIG. 2 depicts a block diagram of an example architecture 200 of a container orchestration platform. At node runtime, the OS image 252 is installed. Node lifecycle 260 creates an instance template 254 from the OS image 252. The configuration of OS image 252 serves as the foundation for the template, generating an instance template 254, which is further employed to create multiple instances. The instance group 256 manages multiple instances and performs functions like scaling and repair or replacement.

The container runtime operates to manage and execute the respective container. The container runtime configures the root filesystem and network for the container and initiates the application to run within it. The container image can be pulled from the external repository 270 and stored in the local storage 220. Subsequent executions of the same container can utilize the cached container image. As previously described, delays in container execution may occur due to large-scale container images. The container orchestration platform preloads the container to create a disk image and attaches the disk image to the secondary boot disk 230, shortening the image loading time.

Figure 3:
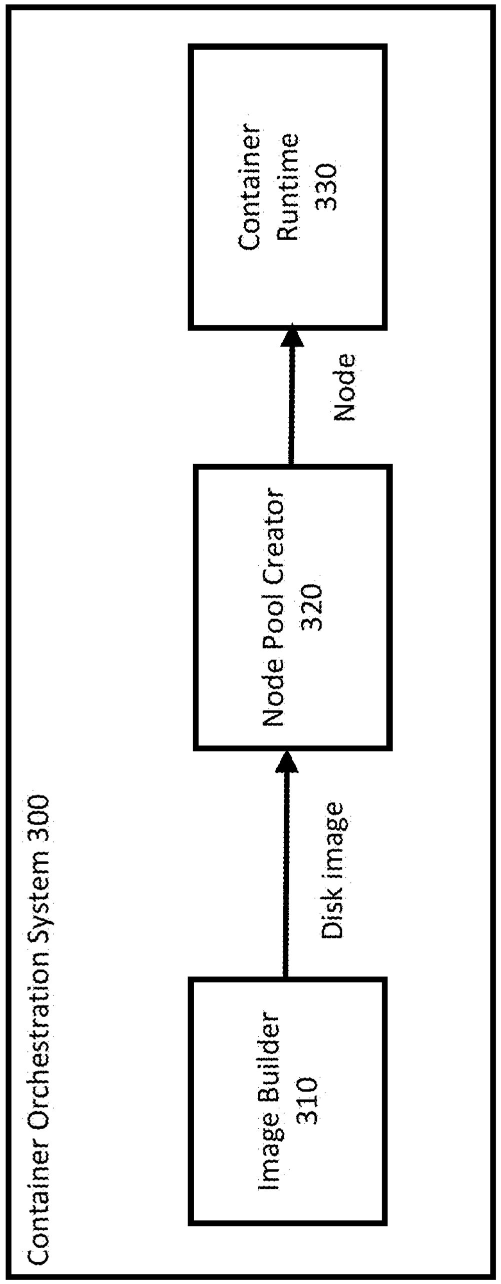
FIG. 3 depicts a block diagram of an example container orchestration system for the container orchestration platform according to aspects of the disclosure.

FIG. 3 depicts a block diagram of an example container orchestration system 300 for the container orchestration platform. The container orchestration system 300 can be implemented on each of a plurality of server computing devices in a distributed cloud platform, such as the server computing devices 102.

The container orchestration system 300 can include an image builder 310, a node pool creator 320, and container runtime 330. The image builder 310, a node pool creator 320, and container runtime 330 can be implemented as one or more computer programs, specially configured electronic circuitry, or any combination thereof.

The image builder 310 can be configured to generate a disk image composed of one or more container images. The image builder can create a disk to generate a disk image. The disk can be used as a temporary storage for generating preloaded container images. The image builder 310 can pull the container images onto the disk. As an example, the image builder 310 can take in image names of multiple container images. The image builder 310 can download the container image onto the disk using the provided image name. The image builder 310 can unpack the container image and create snapshots of the container image layers from the disk. The snapshots of the container image layers can be copied to a secondary disk to form the disk image. The image builder 310 can generate metadata indicating the unique identifiers and stored locations of the snapshots within the secondary disk.

For example, the image builder 310 can mount the secondary disk at a specific path to the container image layers. The secondary disk can be a repository for snapshots required to generate the disk image. After downloading all components necessary to compose the container image, including files, libraries, and configurations, the image builder creates a temporary view for each layer. These temporary views are mounted at specific locations on the disk, and snapshots are created from the contents of the mounted views to store on the disk and form the contents of the disk image. Also, the metadata file can be created. The metadata defines the relationship between snapshots and the disk locations of the snapshot. The metadata can include snapshot identifiers (IDs) and snapshot paths indicating the location of the disk.

The node pool creator 320 can be configured to create a node pool, create a secondary boot disk for each node in the node pool, and attach the secondary disk to each node at node pool creation. Also, the node pool creator 320 can define the contract for passing the configurations for the attached secondary disk to the container runtime 330 using an application program interface (API). The node pool creator 320 can send node pool creation requests along with information about the secondary disk. In the node pool creation, the disk information is added to the node template, configuring the type and mode of the disk.

As an example, the node pool creator 320 can create a new node pool, incorporating specifications with a parameter for the secondary disk. The parameter for the secondary disk can include the disk type and mode of the disk. For example, the mode of the secondary disk can be configured as a local cache for the container image. The container runtime 330 can refer to the mode of the secondary disk and utilize the disk as a local cache of the node. When the disk mode is configured as a local cache, the node pool creator 320 passes configuration details to the node so that the secondary disk can be automatically mounted and used by the container runtime. The node pool creator 320 can create a secondary boot disk for each node, and attach the secondary boot disk to each node. This enables the creation of a new node pool, equipped with each node having an attached persistent disk created with the disk image.

The container runtime 330 can be configured to load the container image from the secondary disk. For example, when nodes boot up, node runtime is executed. The script of the node runtime can read environment variables, initialize the disk, and configure the disk as additional storage. If the disk mode information in the environment variables is set to local cache, the container runtime 330 reads cached container images from the secondary disk. The container runtime 330 loads container images stored on the disk directly, reducing the image pull time.

Figure 4:
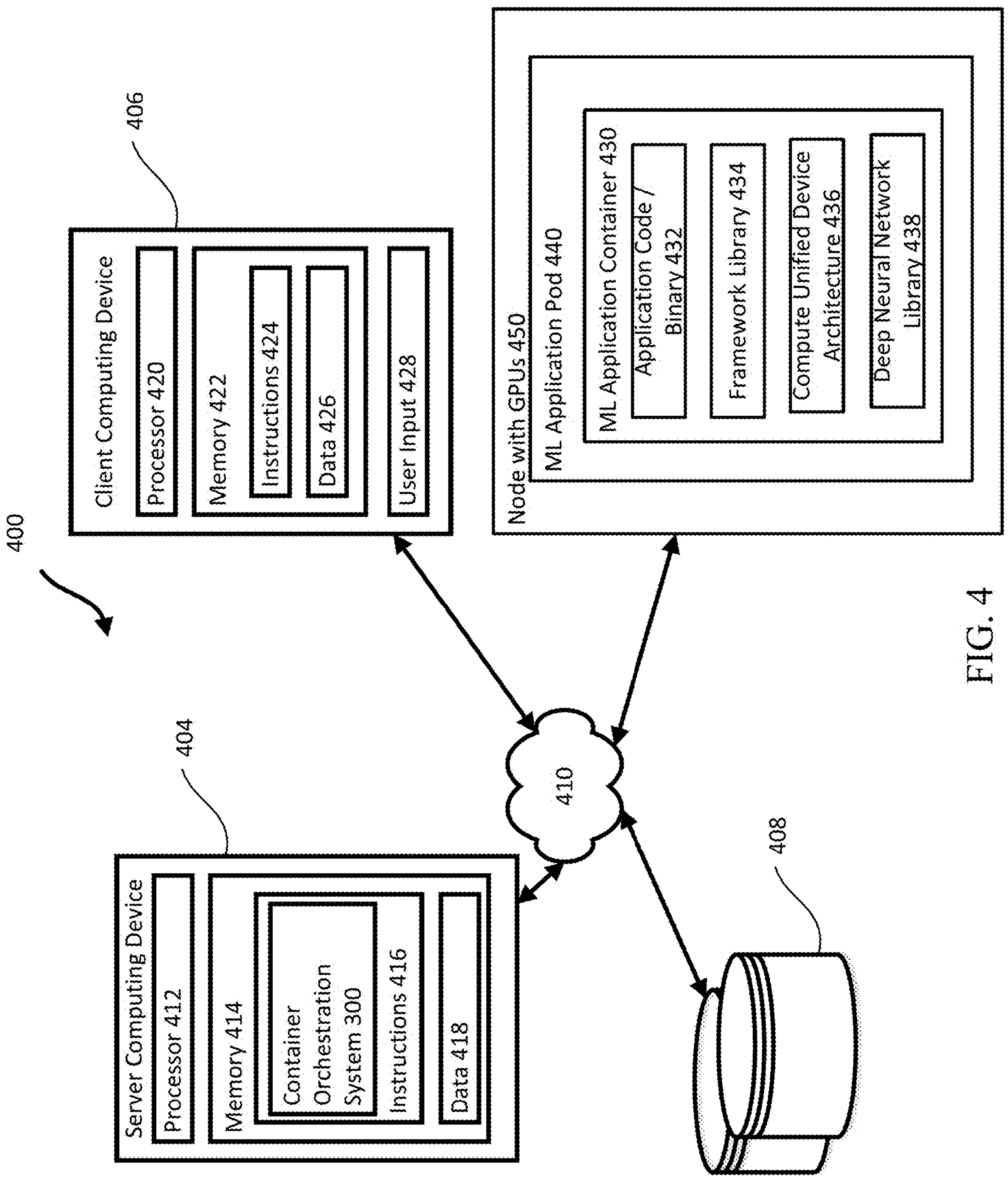
FIG. 4 depicts a block diagram of an example computing environment implementing an example container orchestration system according to aspects of the disclosure.

FIG. 4 depicts a block diagram of an example computing environment 400 implementing the container orchestration system 300, described above. The container orchestration system 300 can be implemented through the container orchestration platform, which provides tools and environments to implement and run the container orchestration. The container orchestration system 300 can be implemented on one or more devices having one or more processors in one or more locations, such as in server computing device 404. The container orchestration system 300 can include one or more engines, modules, or models. The engines, modules, or models can be implemented as one or more computer programs, specially configured electronic circuitry, or any combination thereof. Referring back to FIG. 3, the image builder 310, node pool creator 320, and container runtime 330 can be one of the engines, modules, or models.

User computing device 406, the server computing device 404, and node 450 can be communicatively coupled to one or more storage devices 408 over a network 410. The storage devices 408 can be a combination of volatile and non-volatile memory and can be at the same or different physical locations than the computing devices 404, 406. For example, the storage device(s) 408 can include any type of non-transitory computer readable medium capable of storing information, such as a hard-drive, solid state drive, tape drive, optical storage, memory card, ROM, RAM, DVD, CD-ROM, write-capable, and read-only memories. Cloud storage is a mode of computer data storage in which digital data is stored on one or more storage devices 408 over a network 410.

The server computing device 404 can include one or more processors 412 and memory 414. The memory 414 can store information accessible by the processors 412, including instructions 416 that can be executed by the processors 412. The memory 414 can also include data 418 that can be retrieved, manipulated, or stored by the processors 412. The memory 414 can be a type of transitory or non-transitory computer readable medium capable of storing information accessible by the processors 412, such as volatile and non-volatile memory. The processors 412 can include one or more central processing units (CPUs), graphic processing units (GPUs), field-programmable gate arrays (FPGAs), and/or application-specific integrated circuits (ASICs), such as tensor processing units (TPUs).

The instructions 416 can include one or more instructions that, when executed by the processors 412, cause the one or more processors 412 to perform actions defined by the instructions 416. The instructions 416 can be stored in object code format for direct processing by the processors 412, or in other formats including interpretable scripts or collections of independent source code modules that are interpreted on demand or compiled in advance. The instructions 416 can include instructions for implementing container orchestration system 402. The container orchestration system 402 can be executed using the processors 412, and/or using other processors remotely located from the server computing device 404.

The data 418 can be retrieved, stored, or modified by the processors 412 in accordance with the instructions 416. The data 418 can be stored in computer registers, in a relational or non-relational database as a table having a plurality of different fields and records, or as JSON, YAML, proto, or XML documents. The data 418 can also be formatted in a computer-readable format such as, but not limited to, binary values, ASCII or Unicode. Moreover, the data 418 can include information sufficient to identify relevant information, such as numbers, descriptive text, proprietary codes, pointers, references to data stored in other memories, including other network locations, or information that is used by a function to calculate relevant data.

Node 450 represents a physical server equipped with GPUs. While node 450 is shown separately from server 404, in some examples the node 450 and server 404 can be the same device. The node 450 includes ML application pod 440, including ML application containers 430. A pod may be the smallest deployable unit in a container orchestration platform. It typically includes one or more containers that share networking and storage resources. Container images include the specific code of an application along with all necessary files and dependencies required for its execution. Examples of such files include executable files, libraries, configuration files, and other resources essential for running the application. A container is a collection of running or runnable computer processes that consume files and dependencies included in a container image and resources such as processors, memory, and GPUs.

Within the node 450, the ML container 440 operates and utilizes the resources available on the node 450 during its execution. The ML container 440 can include various components for executing, training, and inferring ML models. Program code 432, in binary format, is included to run the application, and framework libraries 434 can also be included for building and training models.

Further, the ML application container 430 can include libraries associated with GPUs. Examples of such libraries include compute unified device architecture (CUDA) 436 and CUDA deep neural network library (cuDNN) 438. CUDA 436 provides programming for parallel processing on GPUs, while cuDNN 438 accelerates training and inference for deep learning models with high-performance GPU acceleration. Although these libraries may be necessary for the functioning of the ML application, their sizes amount to approximately 4 gigabytes each. When creating a new pod on the node, container images including CUDA 436 and cuDNN 438 are pulled from an external image repository to deploy the ML application. However, due to the substantial size of GPU-related libraries, the initiation of workloads might encounter delays, commonly referred to as cold starts.

The user computing device 406 can also be configured similarly to the server computing device 404, with one or more processors 420, memory 422, instructions 424, and data 426. The user computing device 406 can also include a user input 428, and a user output 730. The user input 428 can include any appropriate mechanism or technique for receiving input from a user, such as keyboard, mouse, mechanical actuators, soft actuators, touchscreens, microphones, and sensors.

The server computing device 404 can be configured to transmit data to the user computing device 406, and the user computing device 406 can be configured to display at least a portion of the received data on a display implemented as part of the user output. The user output can also be used for displaying an interface between the user computing device 406 and the server computing device 404. The user output can alternatively or additionally include one or more speakers, transducers or other audio outputs, a haptic interface or other tactile feedback that provides non-visual and non-audible information to the user of the user computing device 406.

Although FIG. 4 illustrates the processors 412, 420 and the memories 414, 422 as being within the computing devices 404, 406, components described herein, including the processors 412, 420 and the memories 414, 422 can include multiple processors and memories that can operate in different physical locations and not within the same computing device. For example, some of the instructions 416, 424 and the data 418, 426 can be stored on a removable SD card and others within a read-only computer chip. Some or all of the instructions 416, 424 and data 418, 426 can be stored in a location physically remote from, yet still accessible by, the processors 412, 420. Similarly, the processors 412, 420 can include a collection of processors that can perform concurrent and/or sequential operations. The computing devices 404, 406 can each include one or more internal clocks providing timing information, which can be used for time measurement for operations and programs run by the computing devices 404, 406.

The server computing device 404 can be configured to receive requests to process data from the user computing device 406. For example, the environment 400 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 406 may receive and transmit data specifying target computing resources to be allocated for executing a neural network trained to perform a particular neural network task.

The computing devices 404, 406 can be capable of direct and indirect communication over the network 410. The computing devices 404, 406 can set up listening sockets that may accept an initiating connection for sending and receiving information. The network 410 can include various configurations and protocols including the Internet, World Wide Web, intranets, virtual private networks, wide area networks, local networks, and private networks using communication protocols proprietary to one or more companies. The network 410 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 410, in addition or alternatively, can also support wired connections between the computing devices 404, 406, including over various types of Ethernet connection.

Although a single server computing device 404 and user computing device 406 are shown in FIG. 4, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

In addition to the systems described above, various methods which may be executed using the above systems are now described. While the operations of such methods are described in a particular order, it should be understood that the order may be modified and that some operations may be executed partly or wholly in parallel with other operations. Moreover, operations may be added or omitted.

Figure 5:
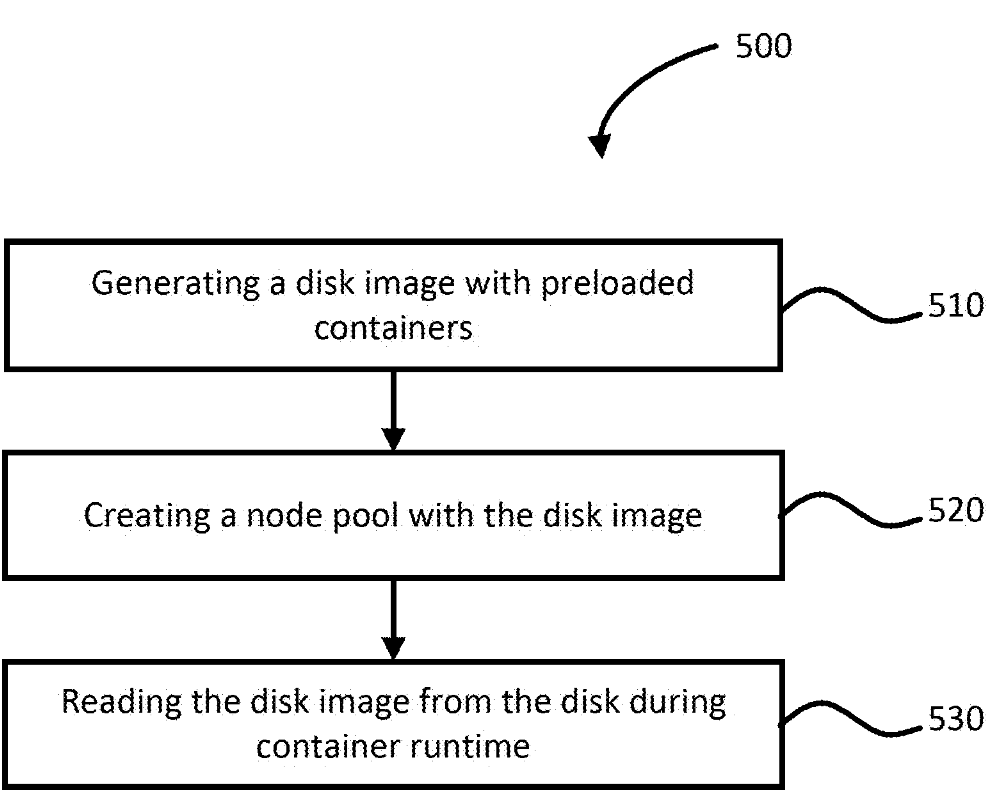
FIG. 5 depicts a flow diagram of an example process for preloaded container images via secondary disks according to aspects of the disclosure.

FIG. 5 depicts a flow diagram of an example process 500 for preloaded container images via secondary disks. The example process 500 can be performed on a system of one or more processors and/or accelerators on a server computing device of a distributed cloud platform, such as the container orchestration system 300 as depicted in FIG. 3.

As shown in block 510, the image builder 310 in the container orchestration system 300 can create a disk image with preloaded containers for the secondary disk. The disk image can include a container image pre-downloaded and pre-unpacked, ready to be used by the container runtime 330.

As shown in block 520, the node pool creator 320 in the container orchestration system 300 can create a node pool with the disk image. The node pool creator 320 can attach the secondary disk to a node when a node pool is created. The node pool creator 320 can use a new parameter to utilize the disk as a secondary boot disk and configure the disk mode as a local cache of the node.

As shown in block 530, the container runtime 330 in the container orchestration system 300 can read a container image from the disk. When the node pool creator 320 configures the disk mode as a local cache, the container runtime 330 can read the container image by caching the image from the secondary disk without the image-pulling process.

Figure 6:
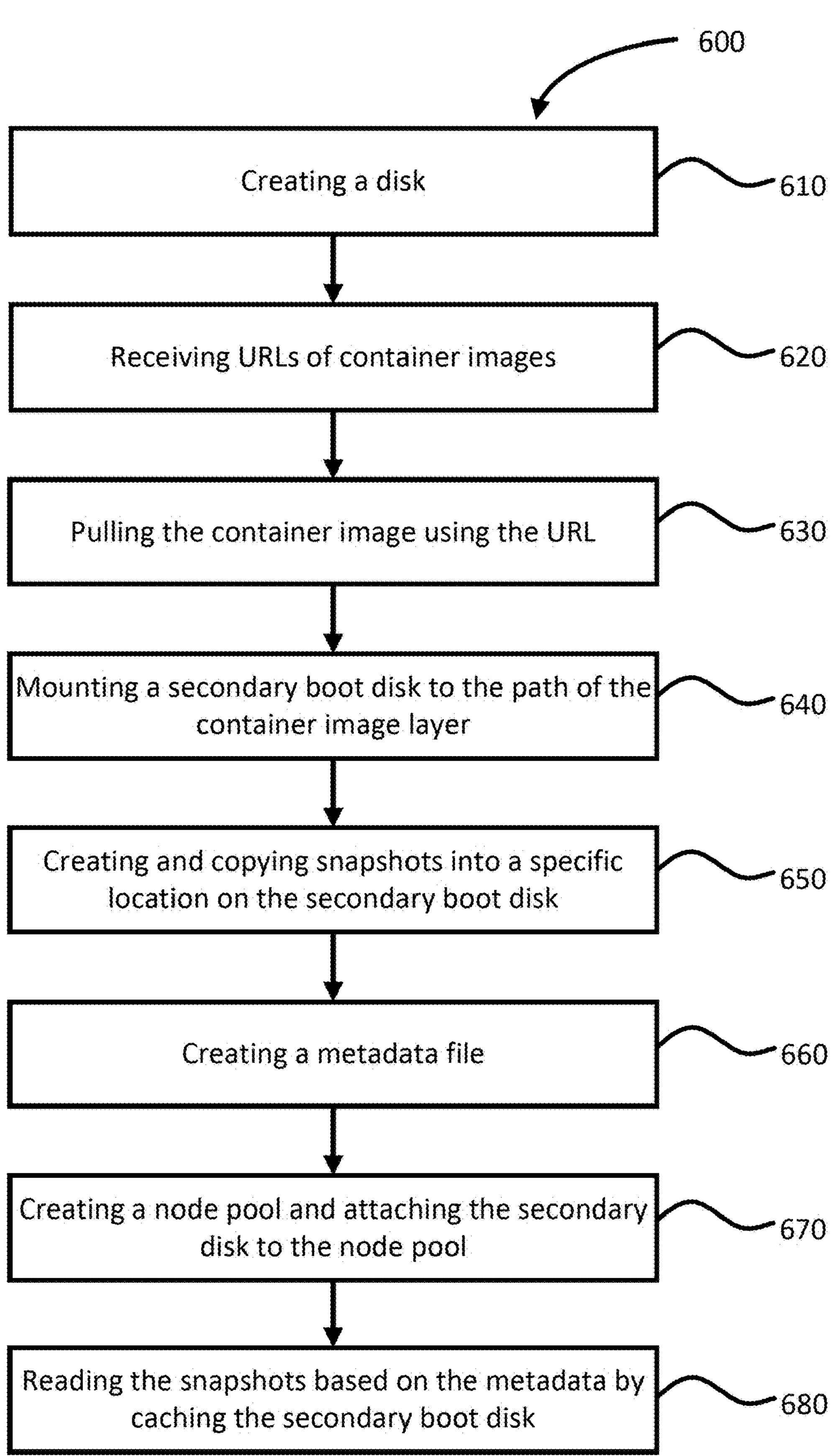
FIG. 6 depicts a flow diagram of an example process for preloaded container images via secondary disks in further detail according to aspects of the disclosure.

FIG. 6 is a flow diagram illustrating an example process 600 for using preloaded container images via secondary disks in further detail. The example process 600 can be performed on a system of one or more processors and/or accelerators on a server computing device of a distributed cloud platform, such as the container orchestration system 300 as depicted in FIG. 3.

As shown in block 610, the image builder 310 in the container orchestration system 300 can create a new disk to generate the disk image for the secondary boot disk. The image builder 310 can receive the list of containers as an input and output the disk image, ready to be used as a secondary boot disk.

As shown in block 620, the image builder 310 can receive a list of image names of the container images stored in the external container repository.

As shown in block 630, the image builder 310 can pull the container image to the created disk using the image name. As an example, the container image stored in the external container repository can be downloaded and unpacked into the created disk.

As shown in block 640, the image builder 310 mounts the secondary boot disk to the node for storing the generated disk image. For example, the mounting location of the secondary boot disk can align with the path of container image layers.

Container images can include multiple layers, each encapsulating alterations, with each layer encompassing changes from the preceding layer. As shown in block 650, the image builder can sequentially download each layer, store the layer on the disk, create temporary views for each layer, and construct snapshots. These generated snapshots are then copied to specific locations on the secondary boot disk, followed by the mapping of metadata files.

As shown in block 660, the image builder generates a metadata file for the snapshots, containing snapshot IDs and their corresponding disk locations. These metadata files associate snapshot IDs with their specific paths on the secondary disk, comprising columns such as Snapshot ID and Snapshot path. Subsequently, the image builder 310 can unmount the previously mounted secondary boot disk and detach the created disk, completing the disk image creation process.

After generating the disk image, the container orchestration system 300 can add the secondary boot disk storing the disk image to the node pool.

As shown in block 670, the node pool creator 320 of the container orchestration system 300 can create a new node pool and attach the secondary disk to the node pool. When requesting node pool creation, information and configurations regarding the secondary boot disk are provided, which are then appended to the node template. The node pool creator 320 can generate environment variables that configure the mode of the secondary boot disk. The environment variables are referenced during container runtime, enabling the initialization of the secondary disks at specific mount paths as additional storage for snapshots.

By attaching the secondary disk to the node pool and setting its mode as a local cache, nodes can utilize the secondary disk as a local cache. As shown in block 680, the container runtime reads the container image from the secondary boot disk, accessing the metadata to load the snapshots. This allows for loading from the secondary boot disk without the need to pull the container image from external storage, effectively caching the disk image.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification, the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of preloading container images via secondary disks on a node, comprising:
- creating a first disk for temporary storage;
- pulling one or more container images from an external repository to the first disk;
- unpacking the one or more container images to the first disk;
- generating, with one or more processors, a disk image of the first disk including a preloaded container for a secondary disk;
- creating, with the one or more processors, a node attached to the secondary disk containing the disk image; and
- reading, with the one or more processors, the preloaded container from secondary disk during container runtime; and
- installing the preloaded container onto the node from the disk image.

2. The method of claim 1, wherein the secondary disk is a persistent disk.

3. The method of claim 1, wherein the secondary disk is a secondary boot disk.

4. The method of claim 1, wherein the disk image is binary data, encapsulating an application and software dependencies.

5. The method of claim 1, wherein generating the disk image of the first disk including the preloaded container comprises:
- mounting the secondary disk; and
- creating a snapshot of the container image from the first disk.

6. The method of claim 5, wherein the creating the snapshot of the container image from the first disk comprises:
- creating a temporary view of a container image layer;
- copying the snapshot into a specific location on the secondary disk; and
- creating a metadata file related to the snapshot and the specific location on the secondary disk.

7. The method of claim 6, wherein the metadata includes a snapshot identifier and a snapshot path.

8. The method of claim 1, further comprising attaching the secondary disk to the node by updating a workload of the node.

9. The method of claim 8, wherein the updating the workload of the node comprises specifying a disk identifier (ID) of the secondary disk on a specification of the node.

10. The method of claim 8, wherein attaching the secondary disk to the node comprises:
- specifying a disk mode of the secondary disk as a local cache; and
- appending a mount path of the disk with the specified disk mode on a specification of the node pool.

11. A system for preloading container images via secondary disks on a node, comprising:
- memory; and
- one or more processors in communication with the memory, the one or more processors configured to:
- create a disk for temporary storage;
- pull one or more container images from an external repository to the first disk;
- unpack the one or more container images to the first disk;
- generate a disk image of the first disk including a preloaded container to a secondary disk;
- create a node attached to the secondary disk containing the disk image; and
- read the preloaded container from the disk image on the secondary disk during node runtime; and
- install the preloaded container onto the node.

12. The system of claim 11, wherein the secondary disk is a persistent disk.

13. The system of claim 11, wherein the secondary disk is a secondary boot disk.

14. The system of claim 11, wherein the disk image is binary data, encapsulating an application and software dependencies.

15. The system of claim 11, wherein in generating the disk image of the first disk including the preloaded container the one or more processors are configured to:
- mount the secondary disk; and
- create a snapshot of the container image from the first disk.

16. The system of claim 15, wherein the one or more processors are configured to:

create the snapshot by creating a temporary view of a container image layer;

copy the snapshot into a specific location on the secondary disk; and create a metadata file related to the snapshot and the specific location on the secondary disk.

17. The system of claim 16, wherein the metadata includes a snapshot identifier and a snapshot path.

18. The system of claim 11, wherein the one or more processors are configured to attach the secondary disk to the node by updating a workload of the node.

19. The system of claim 18, wherein the one or more processors are configured to specify a disk identifier (ID) of the secondary disk on a specification of the node.

20. The system of claim 18, wherein the one or more processors are configured to:

specify a disk mode of the secondary disk as a local cache; and append a mount path of the disk with the specified disk mode on a specification of the node.

* * * * *